Figure 1:
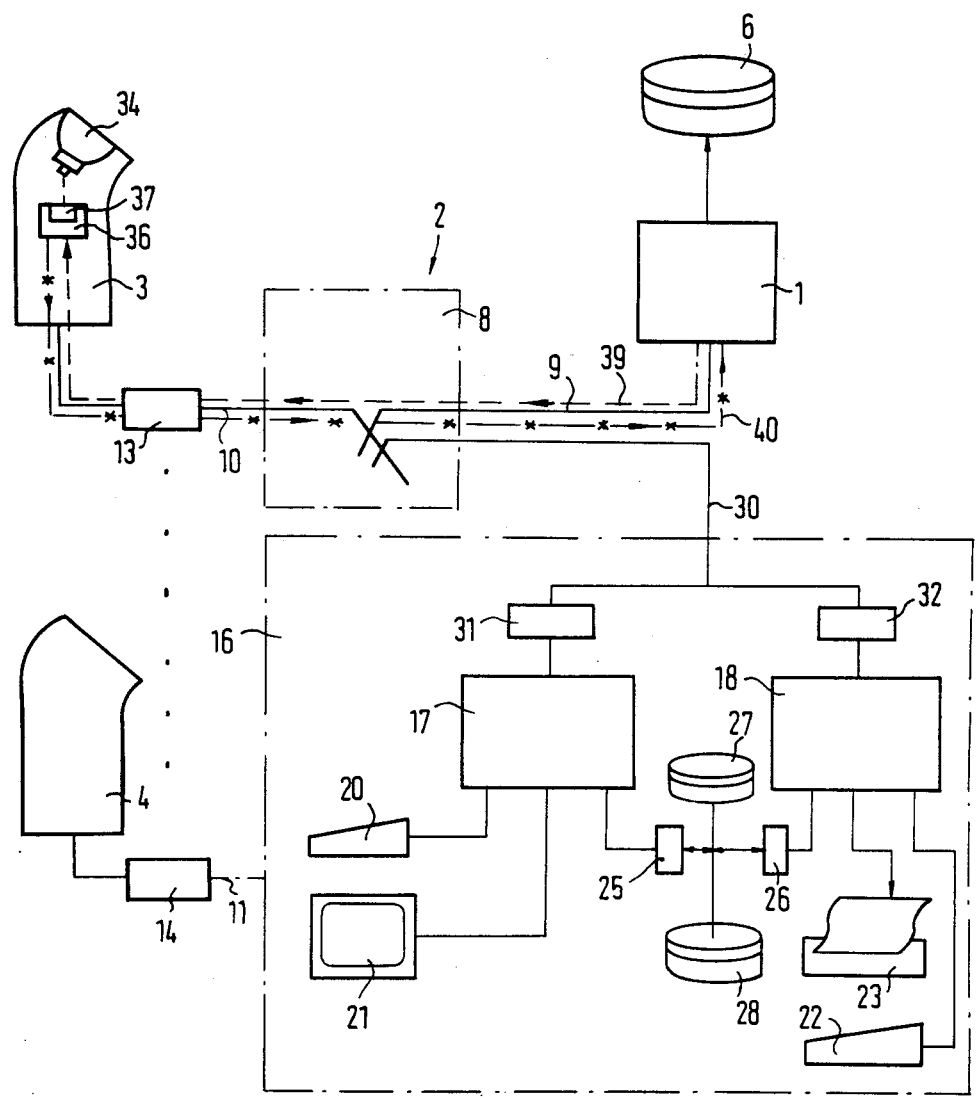

United States Patent [19]

Simon et al.

[11] Patent Number: 4,575,579

[45] Date of Patent: Mar. 11, 1986

[54] EDITING ARRANGEMENT FOR VIDEOTEX SYSTEM WITH PUBLIC TERMINALS

[75] Inventors: Gerhard J. Simon, Hemmingen; Gerhard Schneider, Leonberg, both of Fed. Rep. of Germany

[73] Assignee: International Standard Electric Corporation, New York, N.Y.

[21] Appl. No.: 555,906

[22] Filed: Nov. 29, 1983

[30] Foreign Application Priority Data

Nov. 30, 1982 [DE] Fed. Rep. of Germany ....... 3244212

[51] Int. Cl.[4] .......................................... H04L 21/00
[52] U.S. Cl. .................................... 178/4; 178/17.5; 340/711; 340/717
[58] Field of Search ................. 178/2 R, 2 E, 2 F, 4, 178/17.5, 25, 31; 235/375; 340/709, 711, 717; 455/4; 358/84, 85, 86

[56] References Cited

U.S. PATENT DOCUMENTS 3,500,335  3/1970  Cuccio ............................... 340/717
3,973,244  8/1976  Lovercheck et al. ............... 364/200

Primary Examiner—Stafford D. Schreyer
Attorney, Agent, or Firm—T. L. Peterson; J. M. May

[57] ABSTRACT

In public videotex (Btx) terminals, different pages are displayed successively on the screen in the off-line mode (e.g., advertisements and user instructions). To be able to update such off-line pages at low cost, a page memory in the terminal is constructed as a random-access memory (46). A central operating facility contains an editing device in which the information and control characters required to display an off-line page are produced. These characters are transmitted to the terminal and written into the random-access memory (46). This may be effected automatically when the supply voltage is turned on.

7 Claims, 2 Drawing Figures

EDITING ARRANGEMENT FOR VIDEOTEX SYSTEM WITH PUBLIC TERMINALS

The present invention relates to a videotex system with public terminals whereby information is called up from a videotex center over a telecommunication network and presented in the form of videotex pages on the screen of the terminal, the terminal being provided with a memory containing information which is presented as off-line videotex pages (OBS) on the screen.

Videotex is a well-known information and communications system which uses the telephone network to transmit information. Subscribers having a telephone jack and a television set can call up information from a videotex center via the telephone network and display this information in the form of so-called videotex pages on the screen of the television set (German Pat. No. 28 50 252). In addition, there are public videotex terminals, which are installed, for example, at railroad stations, where travellers need information on the timetable or at post offices, where customers may utilize the postal check service.

In the case of such public videotex (Btx) terminals, so-called off-line videotex pages (OBS) are displayed on the screen, to; these are Btx pages in the off-line mode, in which the terminal is not connected to its Btx center. OBS pages are, for example, pages containing information for the user, advertising pages, and instruction pages, which guide the user during the operation of the terminal. As a rule, these pages are displayed to the user successively for a predetermined time and in a given rhythm. The information and control characters from which the OBS pages are constructed as video pictures are stored in a read-only memory, e.g., an EPROM, incorporated in the terminal.

The OBS pages have to be updated from time to time, e.g., when the advertising is changed. The same applies analogously to the so-called equipment or operating parameters, such as fees, times, page numbers for free or blocked access, etc., which are stored in the read-only memory as well. In conventional public Btx terminals, the read-only memories must be replaced whenever the OBS pages are changed. If a large number of public Btx terminals have been installed, the replacement of the read-only memories is time-consuming, troublesome, and costly.

The object of the invention is to make it easier to update information to be stored in videotex terminals. The invention is characterized in that the memory is a read/write memory, that a central operating facility is provided which includes an editing device in which information and control characters giving an off-line videotex page are produced, and that said characters are transmitted from the operating facility (16) to the videotex center (1), from which they are transmissible over the telecommunication network (2) to the read/write memory (46).

According to an advantageous feature of the invention, the editing device also produces operating parameters which are loaded into the memory (6) of the videotex center (1) and transmitted over the telecommunication network (2) to the read/write memory (46).

If the central operating facility contains a diagnostic computer in which test and diagnostic programs are produced, the latter, too, can be loaded into the read/write memory via the telecommunication network and executed by a control computer of the terminal. The results of the test and diagnostic programs are either displayed by the control computer on the screen of the terminal or transmitted by the control computer to the operating facility.

Further advantageous features of the invention are characterized in the other claims.

Figure 2:
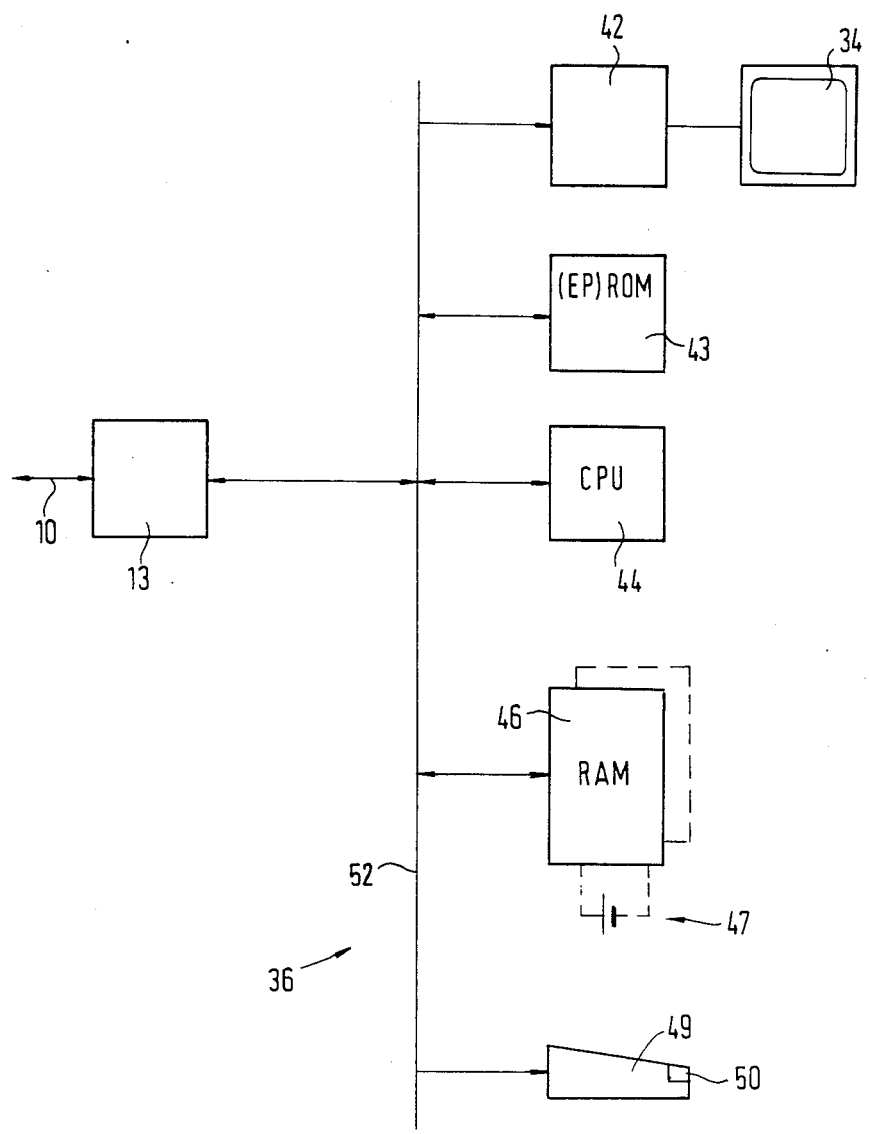

An embodiment of the invention will now be explained with reference to the accompanying drawing, in which:

FIG. 1 shows a videotex system with public terminals in accordance with the invention, and FIG. 2 is a block diagram of a public terminal of the videotex system of FIG. 1.

A videotex system consists essentially of a videotex (Btx) center 1, which is connected to the terminals, in the present case to public Btx terminals 3 and 4, via the telephone network 2. The center 1 comprises a mass storage 6, in which the information that can be called up by the users is stored.

Of the telephone network, only an exchange 8 is shown schematically, which is connected to the center 1 by a trunk 9 and to the terminals 3 and 4 by subscriber lines 10 and 11, respectively.

Each of the terminals 3, 4 is connected to its subscriber line 10, 11 via a modem 13, 14 which permits the video and other information to be transmitted in the voice band over the telephone network. The center 1 is equipped with corresponding modems (not shown).

Connected to the Btx center 1 is an operating facility 16 which contains essentially an editing device 17 and a diagnostic computer 18 for public Btx terminals. For operating the editing devcie, a keyboard 20 and a video terminal 21 are provided. The diagnostic computer 18 is operated via a keyboard 22, while a printed output of the computer 18 can be produced by a printer 23.

The editing device 17 and the diagnostic computer 18 are connected to the disk drives of common disk storages 27 and 28 via interfaces 25 and 26. A line 30 connects the operating facility 16 to the exchange 8. The editing device 17 and the diganostic computer 18 are connected to this line 30 via modems 31 and 32, respectively.

The public Btx terminal 3 is provided with a screen 34 and a controller 36 (see FIG. 2). The controller 36 includes a decoder 37, in which the video information is conditioned so as to be suitable for display on the screen 34.

A broken line 39 indicates that on-line videotex pages and, according to the invention, off-line videotex pages are transmitted from the Btx center 1 to the public Btx terminal 3 via the trunk 9, the exchange 8 and the subscriber line 10. A dash-dot line 40 indicates the transfer of diagnostic information from the controller 36 of the terminal 3 over the same path back to the Btx center 1, as will be explained in more detail with the aid of FIG. 2.

The controller 36 of the terminal 3 contains a control circuit 42 for the screen 34, a read-only memory 43, which may also be an EPROM and contains the operating system and an off-line generator, and a control computer or central processor 44 (FIG. 2). The controller 36 also includes a read/write memory 46, which is constructed as a RAM and may be provided with a buffer battery 47. This memory 46 may be duplicated, as indicated in the drawings. Through the central operating facility 16, it is loaded with the information, and control characters required to generate the off-line videotex pages. Besides the off-line video information, equipment parameters and test programs may be entered into the read/write memory 46 through the central operating facility 16.

A keyboard 49 makes it possible to operate the public Btx terminal. It may be provided with a secured switching device 50—e.g. a lock—to ensure that only the operator of the videotex facility can access the off-line videotex pages and the operating parameters stored at the center 1 and write them into the memory 46 of the terminal 3. The safeguard against unauthorized access may also be implemented with a password or the like.

The above-described parts of the terminal controller 36 are connected together and to the Btx modem 13 by an address and data bus 52.

Instead of being called up by the operator as mentioned in the foregoing, the OBS pages and the operating or equipment parameters may also be loaded into the read/write memory 46 of the terminal 3 automatically, namely whenever the supply voltage is turned on. In that case, the desired OBS pages and equipment parameters are accessed by automatic dialling of the Btx center and subsequent information transfer. This mode of operation has the advantage that in the off-line mode, the latest information can always be offered. This is particularly advantageous, for example, if new information pages are prepared every day by an editorial staff.

The OBS pages are produced with the aid of the editing device 17 of the operating facility 16 and stored in the Btx center 1. They can then be transmitted to the terminals 3, 4 and stored in the read/write memories 46 of the latter at any time. The memory 46 is either contsructed as a nonvolatile memory or provided with the buffer battery 47.

To be able to perform the necessary functions—dialling of the Btx center, selection of the desired pages, interpretation of the data, entry of the information via the keyboard, and output via the screen—, the controller 36 needs suitable programs, such as an off-line generator. With the aid of these programs, which are stored in the read-only memory 43 together with the necessary operating system, test and diagnostic programs can be executed, too. The test and diagnostic programs are generated in the diagnostic computer 18 of the central operating facility 16, transmitted to the terminal, and, like the OBS pages, written into the read/write memory 46. They may also be stored as Btx information in the Btx center and called up by maintenance personnel at the terminal as required. They are then executed in the terminal 3, 4 under control of the central processor 44, usually a microprocessor. The results of the test and diagnostic programs are presented directly on the screen 34 and/or transmitted to the Btx center and analyzed there, so that they are available for central diagnosis.

Compared with the off-line videotex pages, operating parameters, and diagnostic programs hitherto stored in a read-only memory of the terminal, the solution described has an advantage in that it permits central equipment to be utilized for service and maintenance support. In addition, a virtually unlimited amount of programs and data can be stored at a central location, while only about 20 videotex pages and a limited number of other data can be stored at the terminal. The memory capacity is utilized in optimal fashion. The test software can be designed for easy operation that permits comfortable interactive communication with the aid of the screen.

We claim:

1. Videotex system with public terminals whereby information is called up from a videotex center over a telecommunication network and presented in the form of videotex pages on a screen of the terminal, the terminal being provided with a memory containing information which is presented as off-line videotex pages on the screen, characterized in that the memory is a read/write memory (46), that a central operating facility (16) is provided which includes an editing device (17) in which information and control characters giving an off-line videotex page are produced, and that said characters are transmitted from the operating facility (16) to the videotex center (1), from which they are transmissible over the telecommunication network (2) to the read/write memory (46).

2. A videotex system as claimed in claim 1, characterized in that the editing device (17) produces operating parameters which are loaded into storage (6) of the videotex center (1) and transmitted over the telecommunication network (2) to the read/write memory (46).

3. A videotex system as claimed in claim 1, characterized in that the central operating facility (16) contains a diagnostic computer (18) in which test and diagnostic programs are produced which are loaded into the read/write memory (46) via the telecommunication network (2) and executed by a control computer (44) of the terminal (3, 4).

4. A videotex system as claimed in claim 3, characterized in that results of the test and diagnostic programs are displayed by the control computer (44) on the screen (34) of the terminal (3) and/or transmitted by the control computer (44) to the videotex center (1).

5. A videotex system as claimed in claim 2, characterized in that the terminal (3) includes a secured switching device (50) which permits the information and control characters and/or the operating parameters to be fetched from the operating facility (16).

6. A videotex system as claimed in claim 5, characterized in that the information and control characters and/or the operating parameters are fetched from the operating facility (16) by a controller (36) of the terminal (3) whenever the supply voltage is turned on.

7. A videotex system with public terminals whereby information is called up from a videotex center over a telecommunication network and presented in the form of videotex pages on the screen of the terminal, the terminal being provided with a memory containing information which is presented as off-line videotex pages on the screen, said system comprising:
controller means (36) including a read/write memory (46) in said terminal (3,4);
a control computer (44) in said controller means (36);
a central operating facility (16) including an editing device (17) for providing information and control characters for producing off-line videotex pages;
means at said central operating facility (16) for transmitting said information and control characters from said operating facility (16) to storage means (6) of the videotex center (1), from which they are transmissible over the telecommunication network (2) to said read/write memory (46);
a diagnostic computer (18) for providing test and diagnostic programs at said central operating facility (16); and
means at said central operating facility (16) for transmitting said test and diagnostic programs for loading into said read/write memory (46) via the telecommunication network (2) for execution by said control computer (44).

* * * * *